United States Patent
Satagopan et al.

(10) Patent No.: US 6,457,053 B1
(45) Date of Patent: Sep. 24, 2002

(54) MULTI-MASTER UNIQUE IDENTIFIER ALLOCATION

(75) Inventors: Murli D. Satagopan, Bellevue; Dave D. Straube, Redmond; Colin H. Brace, Seattle; Chris L. Mayhall, Issaquah; Donald J. Hacherl, North Bend, all of WA (US)

(73) Assignee: Microsoft Corporation, Redmond, WA (US)

(*) Notice: Subject to any disclaimer, the term of this patent is extended or adjusted under 35 U.S.C. 154(b) by 0 days.

(21) Appl. No.: 09/157,772

(22) Filed: Sep. 21, 1998

(51) Int. Cl.[7] .................. G06F 15/16; G06F 17/30; G06F 15/173
(52) U.S. Cl. ............ 709/226; 709/209; 709/223; 709/226; 709/229; 709/244; 707/200
(58) Field of Search ................. 709/204, 213, 709/219, 223, 229, 244, 209, 226; 707/200; 370/311

(56) References Cited

U.S. PATENT DOCUMENTS

| | | | | |
|---|---|---|---|---|
| 5,768,519 A | * | 6/1998 | Swift et al. ................. 709/223 |
| 5,812,773 A | * | 9/1998 | Norin ........................ 709/204 |
| 5,884,322 A | * | 3/1999 | Sidhu et al. ................ 707/200 |
| 5,987,506 A | * | 11/1999 | Carter et al. ................ 709/213 |
| 5,991,279 A | * | 11/1999 | Haugli et al. ............... 370/311 |
| 6,128,654 A | * | 10/2000 | Runaldue et al. ........... 709/219 |

OTHER PUBLICATIONS

Steedman, D., *X.500 the directory standard and its application*, Technology Appraisals, 1993, 1–165.

* cited by examiner

*Primary Examiner*—Mehmet B. Geckil
*Assistant Examiner*—Farzaneh Farahi
(74) *Attorney, Agent, or Firm*—Woodcock Washburn LLP

(57) ABSTRACT

A system for multi-master unique identifier allocation comprises a server for allocating pools of identifiers to requesting servers and at least one server for requesting pools of identifiers and allocating individual identifiers as necessary. A single master server allocates "pools" of unique identifiers to network servers upon request. The network servers in turn allocate unique identifiers from their pool as necessary when the server generates new system objects. When a network server's pool of unique identifiers is nearly depleted, the network server requests an additional pool of identifiers from the master server.

26 Claims, 11 Drawing Sheets

MULTI-MASTER UNIQUE IDENTIFIER ALLOCATION

CROSS REFERENCE TO RELATED APPLICATIONS

This application is related by subject matter to the inventions disclosed in commonly assigned U.S. patent application Ser. No. 09/157,774, now U.S. Pat. No. 6,324,511, filed on an even date herewith, entitled "Floating Single Master Operation."

TECHNICAL FIELD

The present invention relates generally to distributed computer systems, and more particularly to a multiserver system for unique identifier allocation.

BACKGROUND OF THE INVENTION

Generally, in modern computing systems, unique identifiers (such as security identifiers or a relative identifier thereof) are associated with system generated objects to clearly identify an object to the system and distinguish any one object from others in the system. Users, groups of users, files, and hardware components such as servers and printers are all typically considered objects which have a unique identifier associated therewith. Unique identifiers are used by most systems to associate privileges with objects and in general to manipulate objects within the system. Those skilled in the art recognize that in a modern computing system, the generation and maintenance of unique identifiers plays a critical role in the successful operation of the system.

In existing distributed computer operating systems, where a limited number of unique identifiers exist in single group from which the identifiers may be allocated, the task of allocating the unique identifiers has traditionally been performed by a single "master server." Thus, in existing systems, a single server has the capability to generate unique identifiers and all other computers in the system are configured to refer to the single server when a unique identifier is needed. In every instance where a new object needs to be generated, the single master server must be contacted.

There are of course limitations associated with single master server designs. In modern computing systems, very large numbers of unique identifiers may be requested, often in a very short time frame. Assigning a single server to service requests from throughout a network can place a significant burden on the processing capabilities of a single master server. As a consequence, requests may not be serviced quickly or, worse the master server may simply fail. If a master server responsible for generating unique identifiers crashes, the remaining network machines cannot obtain new unique system identifiers and therefore may be unable to generate new system objects. Further, even when a master server's absence from the network is scheduled, as in the case of system maintenance, a new master server needs to be promoted to master and the remaining servers on the network need to be re-configured, typically by manual means, to communicate with the new master.

Multi-server allocation designs have previously been proposed to relieve a single server from having to support an entire network. Several previous multi-server designs have employed globally unique identifiers (GUIDs). GUIDs are generally 128 bit long identifiers. 48 bits of a GUID's 128 bits identify the network card contained in the server that created the GUID. By agreement between network card vendors, each network card (across all vendors) is supposed to have a unique network card identifier associated therewith. This allows each server machine in a network to generate unique GUIDs independently of the other servers in a network simply by concatenating the network card's unique identifier with another string which the particular server knows it has not previously assigned. Because these systems can assume that the network identifiers for each card is unique, the further assumption is made that any unique string that is concatenated with a unique identifier will also be unique within the network.

Multi-server unique identifier systems which employ GUIDs have several limitations. First, the uniqueness of the identifiers is dependent upon prior human agreement, i.e. the agreement between network card vendors to assign unique identifiers to each network card. Error on the part of a network card vendor in assigning unique identifiers to network cards, say for example assigning the same identifier to two network cards, introduces error into the process of generating unique system identifiers. Also, systems relying on GUIDs operate on a probabilistic uniqueness model as opposed to a deterministic model. In probabilistic models which rely on generating large random numbers to create unique identifiers, uniqueness can not in fact be guaranteed although the chance of creating non-unique identifiers is made very small. In a deterministic model, uniqueness is guaranteed. Finally, GUID systems are restricted in the address space that can be used to create unique identifiers. GUIDs are typically constrained to 128 bits and their uniqueness is limited to the 48 bits used to identify the network card.

Thus, there is a need in the art for a system which provides the simplicity associated with a single master server but which also relieves the single master server from the burden associated with a single server fielding all requests for unique identifiers from the entire network. Further, there is a need for a multi-server unique identifier system which does not rely upon prior human agreement to insure uniqueness. Additionally, the system should not be restricted to an address space in which it can operate but rather should be adaptable for use in address spaces of varying sizes depending on the nature of the application.

SUMMARY OF THE INVENTION

Briefly, the present invention provides a system for multi-master unique identifier (e.g., RID) allocation. A single master server allocates "pools" of unique identifiers to network servers upon request. The network servers in turn allocate unique identifiers from the pool of identifiers which it received from the master server. When a network server's pool of unique identifiers is nearly depleted, the network server requests an additional pool of identifiers from the master server. The physical server machine which performs the role of master server may be transferred as needed to ensure that a master server is always available to allocate pools of identifiers to the other, non-master servers. The system includes protocols for gracefully restoring to the network servers, including the master server, which had temporarily been removed from the network. It should be noted that while the present invention is described with respect to am exemplary embodiment involving relative identifiers (RIDs), the invention applies more generally to any type of unique identifier and is in no way limited to the allocation of RIDs.

BRIEF DESCRIPTION OF THE DRAWINGS

Other features of the invention are further apparent from the following detailed description of presently preferred exemplary embodiments of the invention taken in conjunction with the accompanying drawings, of which.

DETAILED DESCRIPTION OF THE INVENTION

The present invention provides a system wherein multiple servers cooperate to allocate unique identifiers in a distributed system. According to the invention, a single master server is designated to allocate "pools" of unique identifiers to other network servers upon request. A pool is any group of more than one unique identifier. Each requesting server in turn allocates specific instances of the identifiers as necessary. When the pool of unique identifiers that has been dispatched to a network server is nearly depleted, the network server requests an additional pool of identifiers from the master server.

Prior to explaining the details of preferred embodiments of the invention, it is useful to provide a description of a suitable exemplary environment in which the invention may be implemented.

Exemplary Operating Environment

1. A Computer Environment

Figure 1:
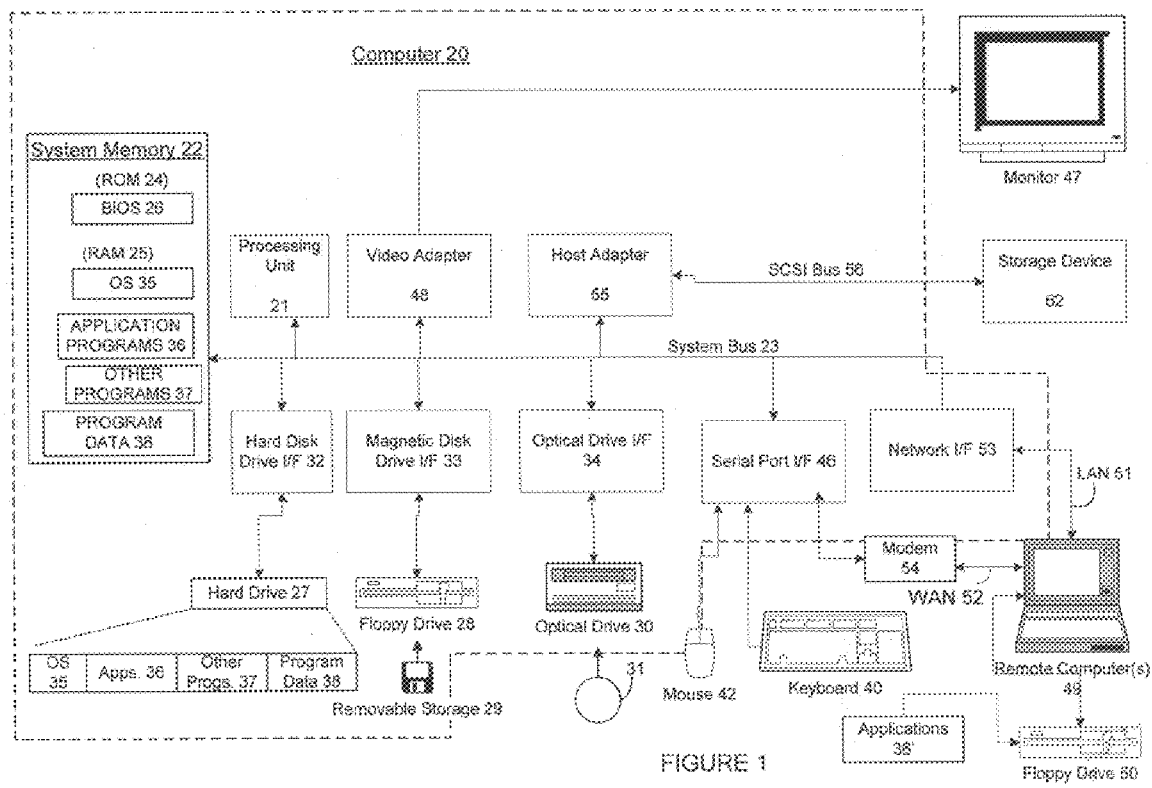
FIG. 1 is a block diagram representing a computer system in which aspects of the present invention may be incorporated.

FIG. 1 and the following discussion are intended to provide a brief general description of a suitable computing environment in which the invention may be implemented. Although not required, the invention will be described in the general context of computer-executable instructions, such as program modules, being executed by a computer, such as a workstation or server. Generally, program modules include routines, programs, objects, components, data structures and the like that perform particular tasks or implement particular abstract data types. Moreover, those skilled in the art will appreciate that the invention may be practiced with other computer system configurations, including hand-held devices, multi-processor systems, microprocessor-based or programmable consumer electronics, network PCS, minicomputers, mainframe computers and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read-only memories (ROMs) and the like may also be used in the exemplary operating environment. Further, as used herein, the term "computer readable medium" includes one or more instances of a media type (e.g., one or more floppy disks, one or more CD-ROMs, etc.).

A number of program modules may be stored on the hard disk, magnetic disk 29, optical disk 31, ROM 24 or RAM 25, including an operating system 35, one or more application programs 36, other program modules 37 and program data 38. A user may enter commands and information into the personal computer 20 through input devices such as a keyboard 40 and pointing device 42. Other input devices (not shown) may include a microphone, joystick, game pad, satellite disk, scanner or the like. These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, Intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

2. A Network Environment

Figure 2:
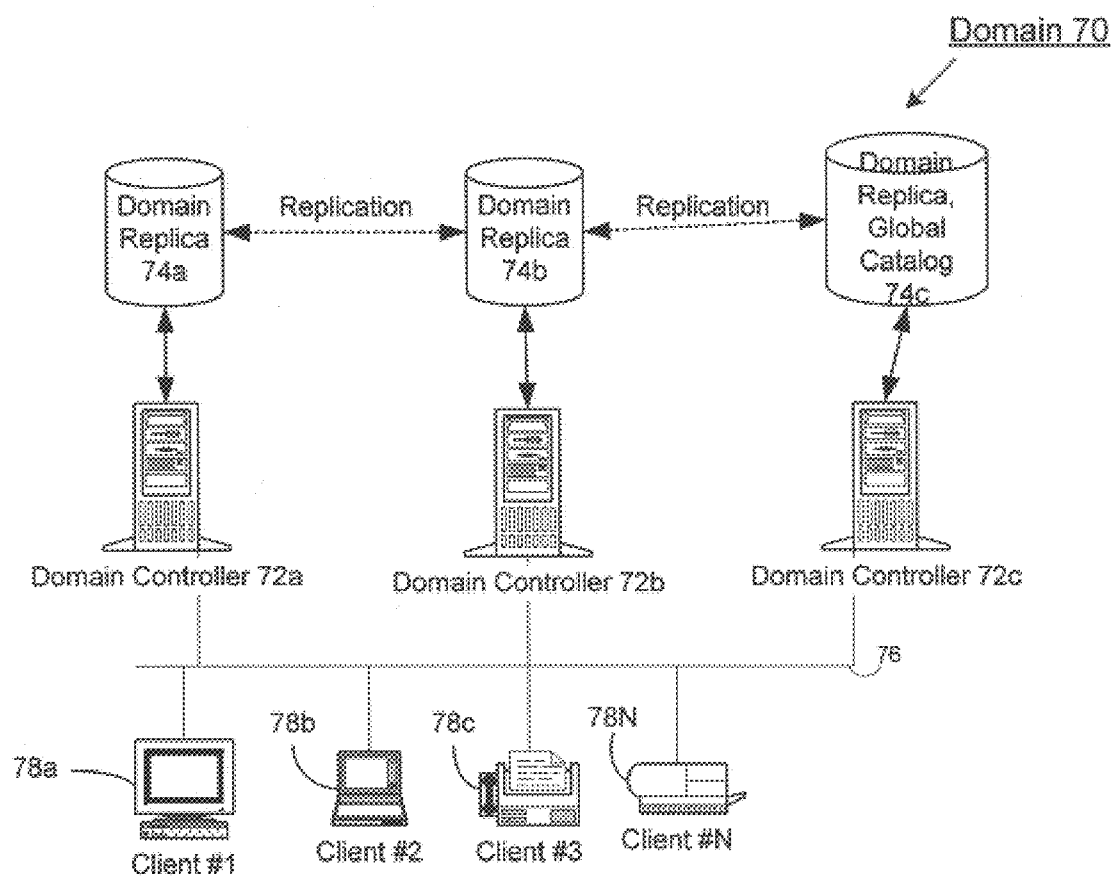
FIG. 2 is schematic diagram representing a network domain in which aspects of the present invention may be incorporated.

As noted, the computer described above can be deployed as part of a computer network. In general, the above description applies to both server computers and workstation computers deployed in a network environment. FIG. 2, illustrates an exemplary network environment in which the present invention may be employed. FIG. 2 shows a network of workstation and servers organized in an exemplary organizational unit domain 70, where the domain presents a common security boundary within a network. As shown, it includes a plurality of servers 72a, 72b and 72c, which are configured as domain controllers and include a corresponding replica 74a, 74b and 74c, respectively, of a directory maintained by the domain. The function of the directory is described in further detail below in connection with FIG. 3. is The domain controllers are interconnected by a bus 76, which in turn couples various clients including workstation 78a, notebook 78b, facsimile machine 78c, printer 78N, and so on to the domain controllers.

As shown in FIG. 2, the domain 70 provides multi-master replication, meaning that all replicas of a given partition are writeable. This allows updates to be applied to any replica of a given partition. The directory replication system propagates the changes from a given replica to all other replicas. In the past, it had been common to employ two kinds of domain controllers: Primary domain controllers (PDCs) and backup domain controllers (BDCs), where the PDCs held a read/write copy while the BDCs held a read-only copy. In the example of FIG. 2, all domain controllers for the domain are considered peers in that each holds a writeable copy of the directory.

As noted above, the network domain maintains a directory that is accessible over the network. The provision of directory information on the network is typically called a directory service. The directory service component of a distributed computing environment is intended to make it easier to find information. A directory service is like a phone directory. Given a name for a person or a resource, it provides the information necessary to access that person or resource. Administrators, users, and applications can find information about people, printers, files and other shared resources in a single place even if the resources reside on many different physical servers. The directory may be viewed as a distributed database of information about objects, including people, organizations and processes. Objects are assigned to logical workgroups or other organizational units rather than to individual servers. This location independence is fundamental to making distributed computing simple to use and easy to manage. It is even possible to define standard interfaces to the directory so that other directories can integrate with it. In fact, the directory can present information from multiple sources as a single system directory object.

Figure 3:
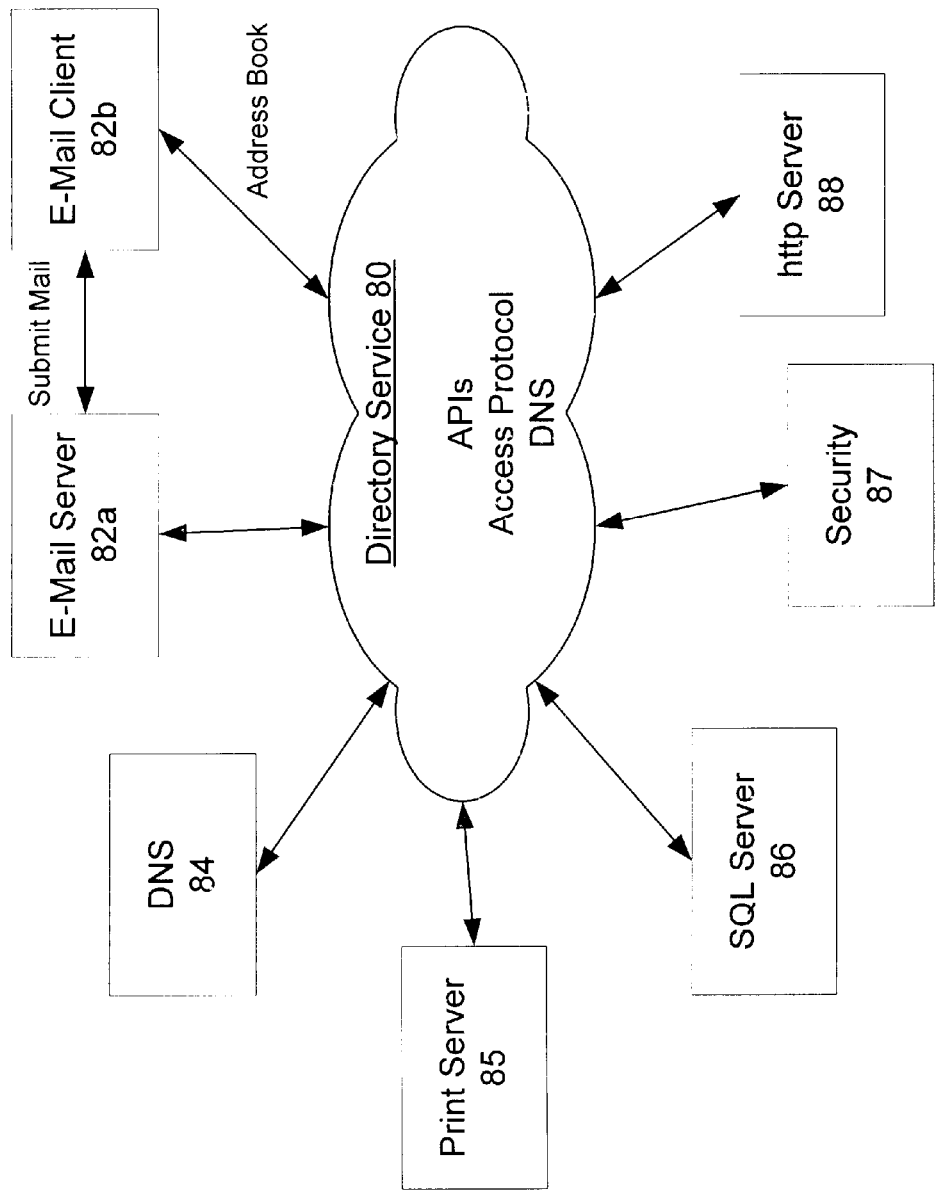
FIG. 3 is a block diagram of a directory service that operates in a network environment and in which aspects of the present invention may be incorporated.

FIG. 3 schematically depicts how a directory service 80 provides a logically centralized location for finding shared resources. Such shared resources may include, e.g., an e-mail server 82a or address book for use by an e-mail client 82b, the Domain Name System (DNS) 84 (the locator service used on the Internet), a print server 85, a database (e.g., SQL) server 86, a security server 87, and an http server 88. One protocol for directory access is the industry-standard LDAP (Lightweight Directory Access Protocol), which allows for extensive interoperability with directory services from multiple sources. The directory service 80 insulates users and administrators from having to navigate the physical structure of the network.

The directory service 80 may make use of the features of DNS and the OSI X.500 directory standard (also known as ISO 9594). For example, since DNS may be used as a global backbone namespace, the directory service may use DNS to look up LDAP services. In addition, multiple application programming interfaces (APIs), such as MAPI and LDAP C may be employed to facilitate the writing of directory-enabled applications that access the directory.

Most enterprises already have many different directories in place. For example, network operating systems, electronic mail systems, and groupware products often have their own directories. Many issues arise when a single enterprise deploys multiple directories. These issues include usability, data consistency, development cost, and support cost, among others. It is common to find a variety of directories (many playing an administrative role) deployed within a single organization. The goal of a directory service such as that discussed above is to provide a single, consistent set of interfaces for managing and using multiple directories. A directory service differs from a directory in that it is both the directory information source and the services making the information available and usable to the users.

A directory of the kind provided by the directory service 80 is, or may be viewed as, a namespace, i.e., a bounded area in which a given name can be resolved. Name resolution is the process of translating a name into some object or information that the name represents. For example, a telephone book forms a namespace in which the names of telephone subscribers can be resolved to telephone numbers. Likewise, the directory service 80 provides a namespace in which the name of an object in the directory can be resolved to the object itself. (An "object" is a distinct, named set of attributes that represents something concrete, such as a user, a printer, or an application. The attributes hold data describing the thing that is identified by the directory object. Attributes of a user might include the user's given name, surname, and e-mail address.)

Figure 4:
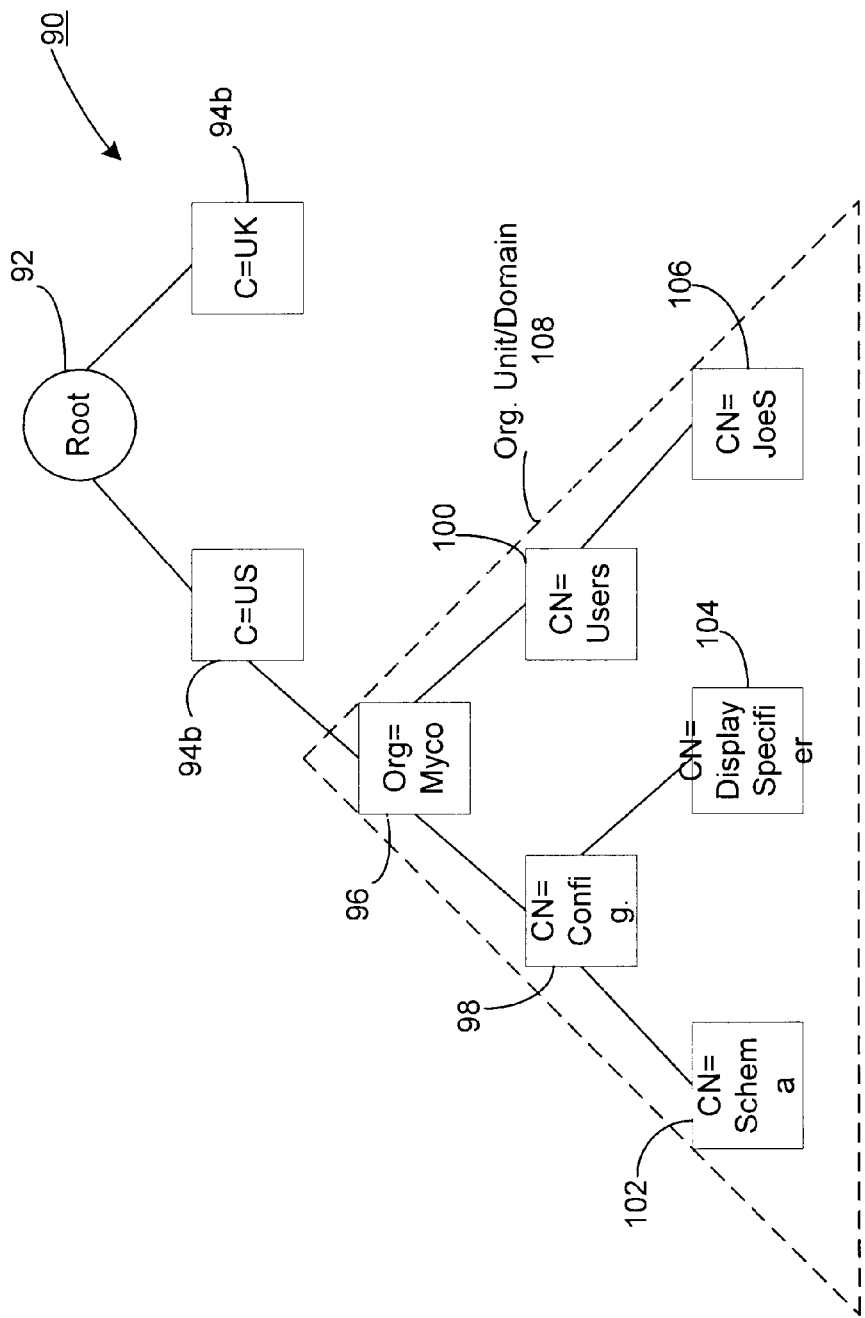
FIG. 4 is a directory tree diagram showing further details of the arrangement of the directory service of FIG. 3.

FIG. 4 depicts an exemplary hierarchical namespace 90. This namespace includes a root 92 and a tree comprising a hierarchy of objects and containers. (A container is like an object in that it has attributes and is part of the namespace. However, unlike an object, it does not represent something concrete. It is used to hold or organize a group of objects and/or other containers.) Endpoints on the tree are usually objects. Nodes or branches are containers. A tree shows how objects are connected or the path from one object to another. A simple directory is a container. A computer network or domain is also a container. The namespace of FIG. 4 includes two country nodes 94a and 94b (corresponding to country=U.S. and country=U.K., respectively), and a sub-tree under node 94a comprising nodes 96 (organization=Myco); nodes 98 and 100 (common name=config. and common name=Users, respectively); and nodes 102, 104 and 106 (common name=Schema, Display Specifier and JoeS). As indicated in FIG. 4, node 96 and its children nodes may be viewed as an organizational unit 108, which is also called a "domain". The organizational unit/domain is served by a closely coupled set of servers, or domain controllers.

As noted above, a domain is a single security boundary of a computer network. The directory is made up of one or more domains. On a standalone workstation, the domain is the computer itself. A domain can span more than one physical location. Every domain has its own security policies and security relationships with other domains. When multiple domains are connected by trust relationships and share a common schema, configuration, and global catalog, they make a domain tree.

In the exemplary network, the directory service is replicated, i.e. copies of a given set of directory service data is distributed to multiple domain controllers. For purposes of replication, the directory tree is logically broken into contiguous blocks called "naming contexts." Every directory service object is located in precisely one naming context. The particular naming context to which an object belongs is dictated by the object's position in the directory tree.

A domain controller is configured to hold a replica of some set of naming contexts. Thus, a domain controller holds a copy of every object inside the set of naming contexts, and holds no other objects. Each domain controller holding a particular naming context is configured to replicate that naming context to and from a particular set of other domain controllers. Thus, replication in the network can be described in terms of simple, unidirectional, replication agreements. For example, a replication agreement might define that a first domain controller replicate a specific naming context from a second domain controller. This replication agreement defines what data the first domain controller replicates and from where it replicates it. Each domain controller knows of only those few replication agreements in which it participates.

In the replication process of the exemplary network, replication operates on a "pull model." According to this model, for the above replication agreement, the first domain controller sends a request for replication to the second domain controller. The second domain controller returns the replication data for the specific naming context defined in the replication agreement in a reply message to the first domain controller. Thus, the pull model requires that replication result from a request by one domain controller to another to forward the latest version of a set of objects. This is contrasted with a "push" model where data is replicated to a machine without there having been a request beforehand.

Generally, a domain controller replicates data at scheduled intervals. As used herein, "scheduled replication" refers to the process whereby at predetermined scheduled intervals a domain controller requests replication for a naming context from each domain controller in its predefined set of domain controllers from which it is configured to replicate. Data may also be replicated outside the replication schedule on an urgent or immediate basis. For urgent replication transactions, a request is made to a single domain controller in response to a notification from that domain controller indicating that there has been an update to an object which should be replicated outside of the set replication schedule. Thus, as used herein "urgent replication" refers to a process wherein a message indicating an object has been updated is first received from another domain controller. Thereafter, a replication request is sent to that domain controller requesting the appropriate updated data. After a packet is successfully applied, the destination server will update its local copy of the agreement with the source's current update number, so that it will not continuously fetch the same changes.

In the exemplary network, objects and not actions are replicated. Thus, the data transmitted in a replication procedure consists of updated objects, as opposed to a collection of changes to be applied, that are to be used in overwriting objects on the destination domain controller.

Multi-Master Unique Identifier Allocation

An exemplary embodiment of the present invention may be implemented in the Microsoft® "WINDOWS NT®" operating system, particularly version 5.0, which comprises a directory service, called "Active Directory" which is consistent with the directory service described above in the exemplary environment section. Notwithstanding, there is no intention to limit the present invention to "WINDOWS NT®" and/or the Active Directory architecture, or even to networks, but on the contrary, the present invention is intended to operate with and provide benefits with any operating system, architecture and/or mechanisms that install applications.

The present invention is directed toward a multiserver system for allocating unique identifiers. In the exemplary embodiment, each user, group of users, and workstation is defined to be a security principal. For each security principal that is generated in the exemplary embodiment, it is necessary to generate a unique security identifier (SID) by which the security principal can be identified within the system. A security principal's unique SID is generated by concatenating the SID for the domain in which the security principal is being created and a relative identifier (RID). A RID in the exemplary embodiment is a 32 bit number that is unique in a domain. Thus, the concatenation of a domain SID, which is unique for domains in a directory, and a RID, which is unique within a domain, is a security principal identifier that is unique within an entire directory.

RIDs are allocated in the exemplary embodiment in accordance with the present invention as described below. Those skilled in the art will appreciate, however, that while the present invention is described with respect to RIDs, the invention applies more generally to any type of unique identifier and is in no way limited to the allocation of RIDs. In accordance with the exemplary embodiment, a single domain controller referred to as the RID Master assigns pools of RIDs to requesting servers located throughout the network. When a new security principal is created in the system at a requesting server, the requesting server allocates a RID from the pool that has been assigned to it from the RID Master.

In the exemplary embodiment, the RID Master is defined to be a floating single master as described in co-pending U.S. Patent Application (serial no. not yet assigned) (atty. docket no. Msft-0010) entitled "Floating Single Master Operation," the contents of which are hereby incorporated by reference in their entirety. Briefly, a floating single master is a server which has exclusive authority to perform a network-wide task. With respect to the RID Master, the network-wide task is assigning RID pools. Although multiple server machines in a network may be capable of performing a particular network-wide task such as RID Master, at any particular moment, only one machine is designated as the master server with exclusive authority to perform the task. The master server for a task can be changed or "floated" to other servers in the system and the remaining servers automatically notified of the change.

The server machine that is acting as the master server with respect to a particular task, or performing the "role" of master server is identified by a "role owner" attribute stored on each of the various servers in the network. In particular, the FSMO_Role_Owner attribute located on the Rid_Master object of the directory service identifies the domain controller that operates as the RID Master. The role owner attribute provides a means for each network server to identify the current RID Master. Floating or changing the RID Master role owner to another server in the network entails changing the FSMO_Role_Owner attribute in the RID_Master object on each network server. In the exemplary embodiment of the invention, the RID_Master object and its FSMO_Role_Owner attribute is stored in the directory service database that is replicated on each server in the system. Updates to the RID_Master object and its FSMO_Role_Owner attribute are performed via replication.

Figure 5:
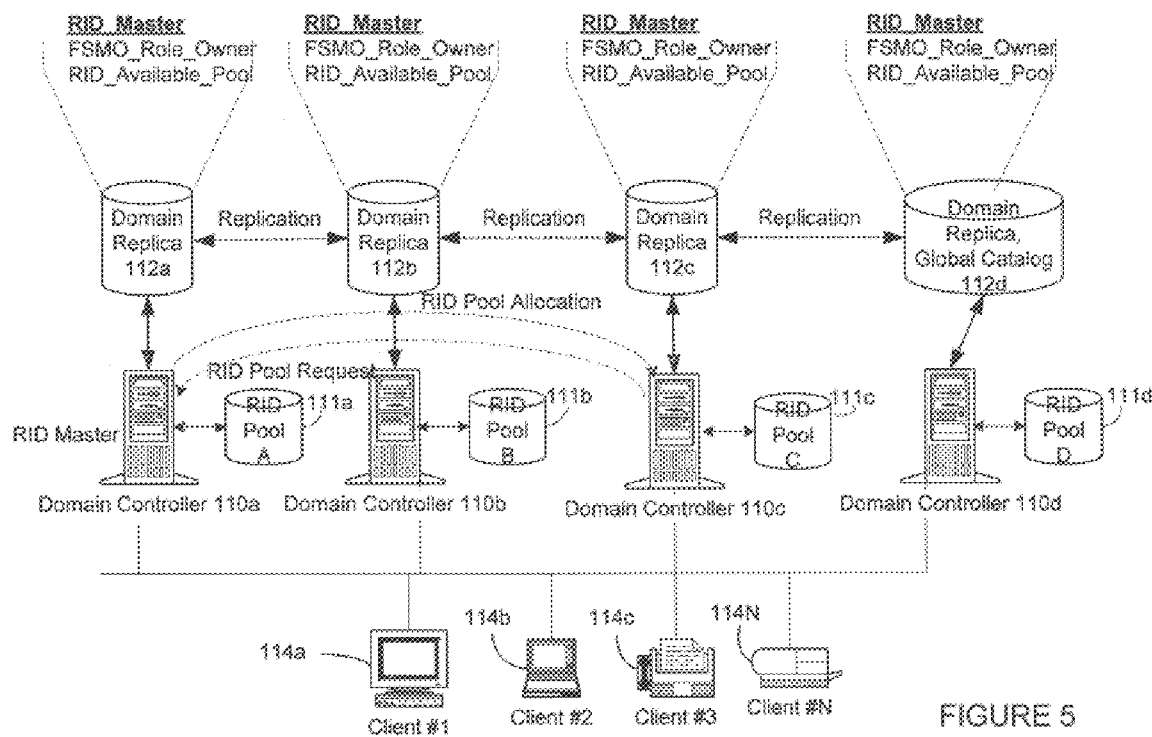
FIG. 5 is a diagram of an illustrative network in which the present invention might operate.

FIG. 5 provides an illustrative diagram of a network in which the present invention might operate. Four server machines 110a, 110b, 110c, and 110d are configured as domain controllers in a network. A local copy (112a, 112b, 112c, 112d) of the directory service database is stored on each domain controller. Each local copy (112a, 112b, 112c, 112d) of the directory service has stored therein the RID_Master object which has an attribute FSMO_Role_Owner located therein for identifying the current RID Master. One of the domain controllers, domain controller 110a for example, may be identified on the RID Master object in the FSMO Role Owner attribute to perform the role of RID Master. The RID Master is responsible for allocating pools of RIDs to domain controllers upon request. Thus, for example, upon the request of domain controllers 110b, 110c, and 110d, domain controller 110a allocates pools (111b, 111c, and 111d) of unique identifiers, specifically RIDs, to domain controllers 110b, 110c, and 110d. A RID pool 111a may also be maintained on domain controller 110a to service requests. Domain controllers 110a, 110b, 110c, and 110d thereafter are able to assign specific RIDs from each of their own respective pools (111a, 111b, 111c, and 111d) to newly created objects or processes. When a domain controller's pool of RIDs comes near to depletion (e.g., when a predefined threshold is reached), a new pool can be pre-fetched from the RID Master 110a. The pre-fetched pool of RIDs is held in reserve until the current pool of RIDs is depleted, at which time RIDs are allocated from the pre-fetched pool.

Figure 6:
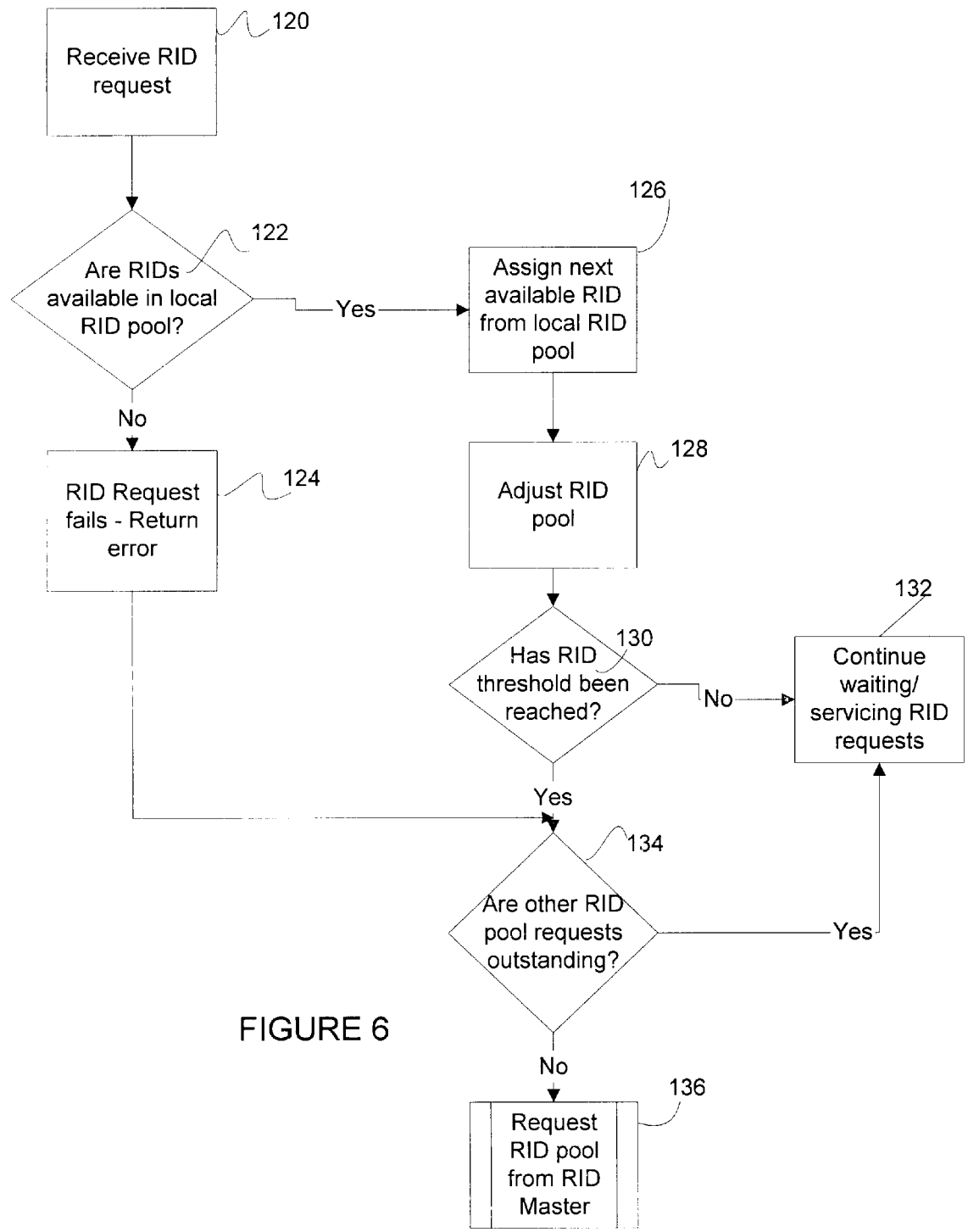
FIG. 6 is a diagram of a process in accordance with the present invention by which individual domain controllers assign relative identifiers.

FIG. 6 provides a diagram of the process by which individual domain controllers assign RIDs. As noted previously, a new RID is allocated when a new security principal, such as a user, group, or workstation is created in the system. Thus, when a new security principal is created on domain controller 110c, for example, at step 120 a request is made for a new relative identifier. At step 122, domain controller 110c checks whether RIDs are available in the local RID pool that was previously received from RID Master 110a. If no RIDs are available in the local pool of domain controller 110c, at step 124 the RID allocation request fails and an error is returned to the process which requested the RID.

Thereafter, beginning at step 134 measures are taken as described below to request a new pool of RIDs. If it is determined at step 122 that RIDs are available in the local RID pool of domain controller 110c, at step 126, the next available RID is assigned out of RID pool 111c of domain controller 110c.

Thereafter, at step 128 RID pool 111c is adjusted to reflect that the particular RID was allocated from the pool. In the situation where the most recently assigned RID was the last RID in the RID pool, adjusting RID pool 111c entails rolling into the current RID pool any pre-fetched RID pool that was retrieved as described below from the RID Master 110a.

Each domain controller must continuously monitor its pool of RIDs in anticipation of requesting a new RID pool. Specifically, a domain controller determines whether a certain threshold of remaining RIDs has been reached. Thus, at step 130, it is determined whether the RID pre-fetch threshold has been reached. If not, at step 132 domain controller 110c continues to service additional RID requests. Of course, if the RID threshold has been reached, at step 134 it is determined whether there are other RID pool pre-fetch requests outstanding. If another RID pool pre-fetch request is outstanding, at step 136 no additional request is necessary and domain controller 110c continues to service RID requests. If at step 134 it is determined that there are no other RID pool pre-fetch requests outstanding, at step 136 a pre-fetch RID pool request is made to the RID Master in accordance with the process described in connection with FIG. 7.

Figure 7:
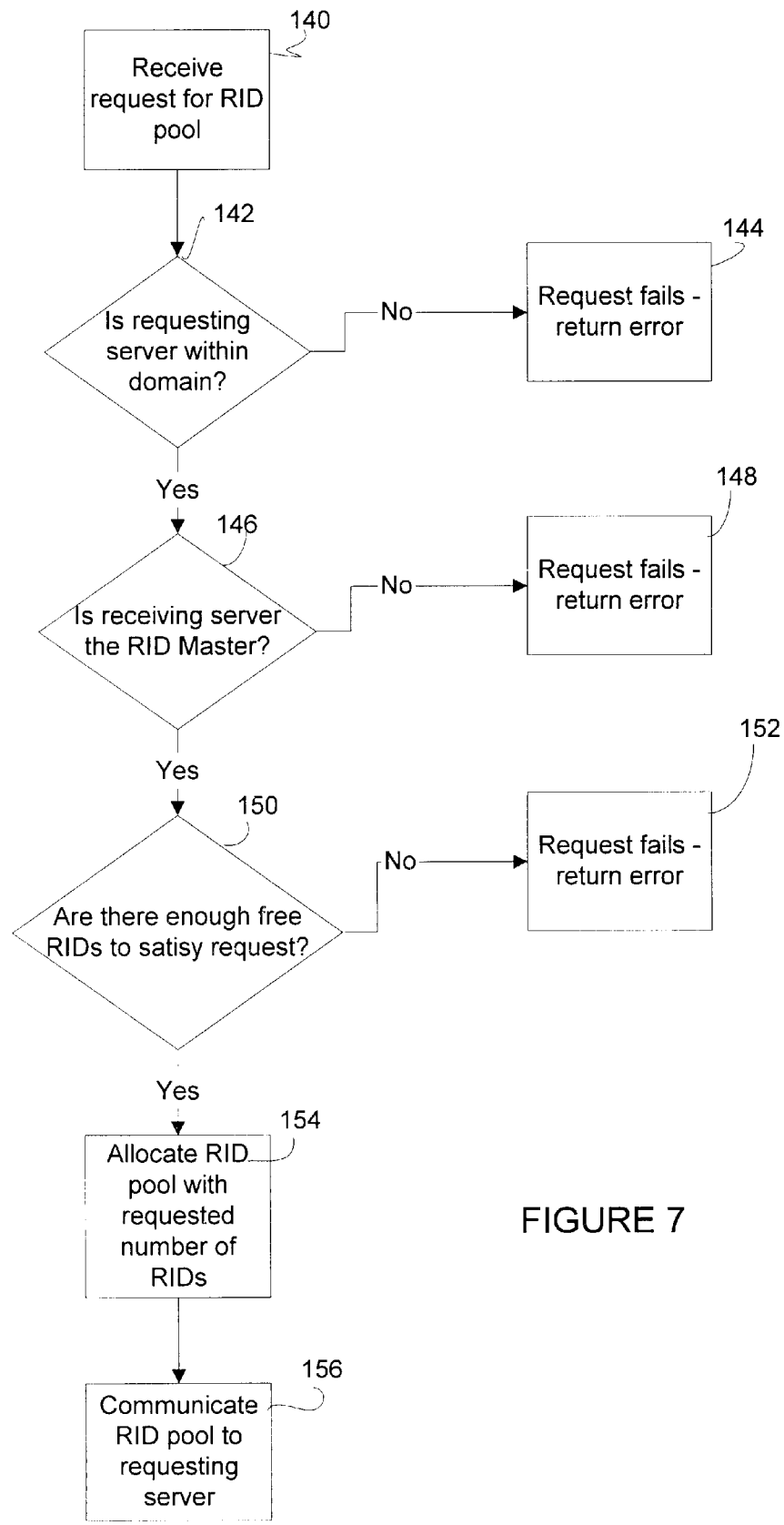
FIG. 7 is a diagram of a process in accordance with the present invention of retrieving RID pools from a RID Master.

FIG. 7 is a diagram of the process of retrieving RID pools from a RID Master. At step 140, a RID Master, for example domain controller 110a of FIG. 5, receives a request for a RID pool from a domain controller, such as domain controller 110c. At step 142, RID Master 110a determines if domain controller 110c is in the domain for which RID Master 110a is authorized to operate. If not, at step 144, the RID pool request fails and an error is returned to domain controller 110c. If, however, domain controller 110c is located within the domain for which RID Master 110a is authorized to act, at step 146 it is verified that domain controller 110a is still the RID Master. Verification of the RID Master status is necessary in order to account for the situation where the RID Master role owner may have been transferred to another domain controller. Verifying the RID Master role owner may be accomplished by replicating the FSMO_Role_Owner attribute from the RID_Master object located on another of the domain controllers (110b, 110c, or 110d). If domain controller 110a is no longer the RID Master, at step 148 the request for a RID fails and an error is returned. If, however, at step 146 it is determined that domain controller 110a is still the RID Master role owner, at step 150 it is determined whether there are enough free RIDs available to satisfy the request. In the exemplary embodiment, a master list of the free RIDs that are available to be allocated into pools are stored as an attribute, RID_Available_Pool, on the RID_Master object in the directory service. If there are not enough RIDs available, an error message is returned to domain controller 110c at step 152. If at step 150 there are enough free RIDs to satisfy the request, at step 154 a RID pool sufficiently large to satisfy the request is allocated from the total RID pool. At step 156, the allocated RID pool is communicated, preferably through replication to domain controller 110c.

Figure 8:
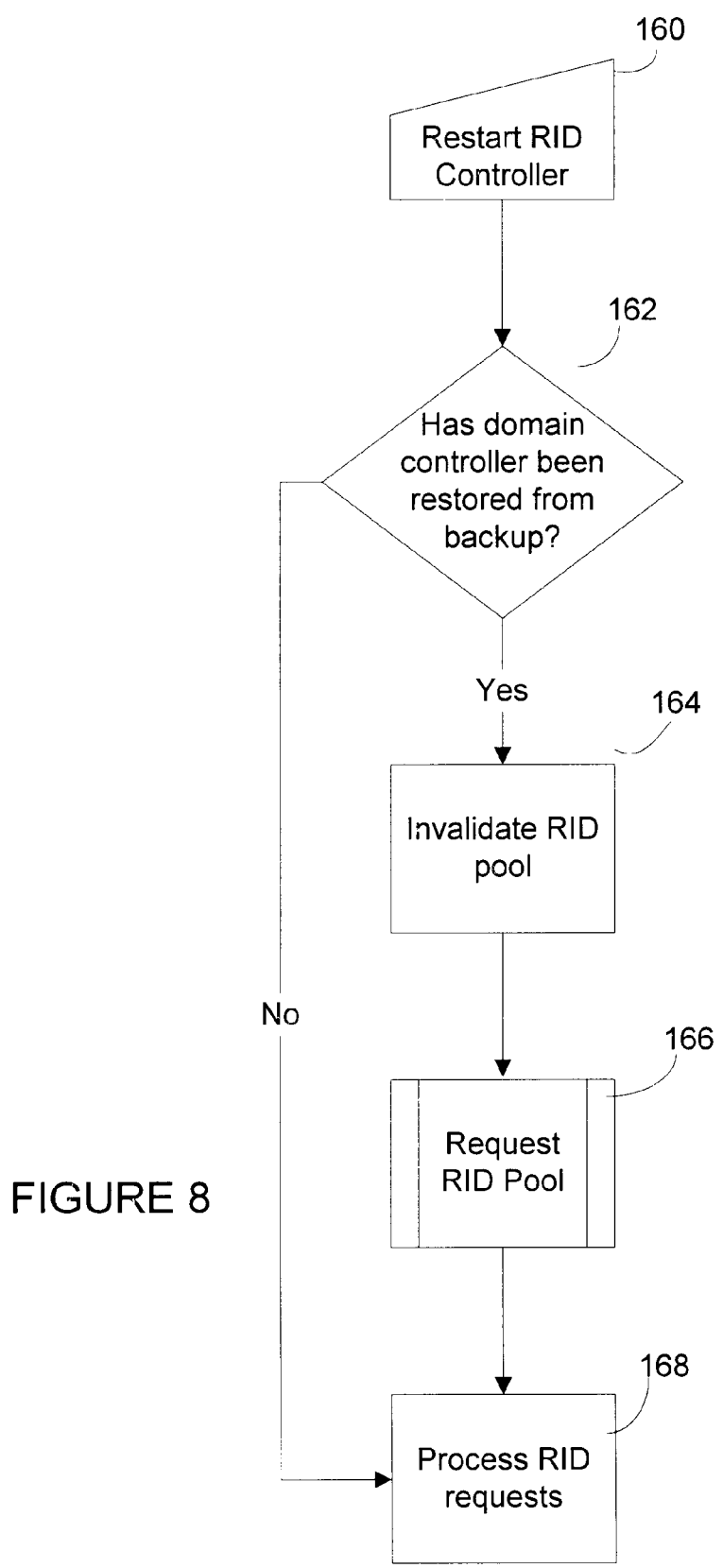
FIG. 8 provides a diagram of a process in accordance with the present invention of returning to the network a domain controller which allocates RIDs.

In some instances, a domain controller having an active pool of RIDs may crash or be taken off-line. In such situations, it may be necessary to restore the domain controller from backup. Generally, when a domain controller is returned to the network after being restored from backup, the existing pool of RIDs is abandoned and a new pool requested. FIG. 8 provides a diagram of the process of returning a domain controller to the network after being restored from backup. At step 160, the RID server, for example domain controller 110b of FIG. 5, is restarted and reconnected to the network. When the domain controller 110b has completed start-up, at step 162, it is determined whether domain controller 110b has been restored from backup. If domain controller 110b has not been restored from backup, domain controller 110b simply continues to process RID requests at step 168. If, however, at step 162 it is determined that domain controller 110b was restored from backup, at step 164 domain controller 110b's current RID pool is invalidated. Thereafter, at step 166, domain controller 110b requests as described above in relation with FIG. 7, a new RID pool from RID Master 110a. Upon receipt of a new pool of RIDs, at step 168, domain controller 110b continues to process RID requests.

Circumstances may arise when it is necessary to change the RID Master from one domain controller to another. This changing of the RID Master may be necessary, for example when the current RID Master is scheduled for maintenance. In such situations, it is appropriate to transfer the RID Master to another domain controller in the network.

Figure 9:
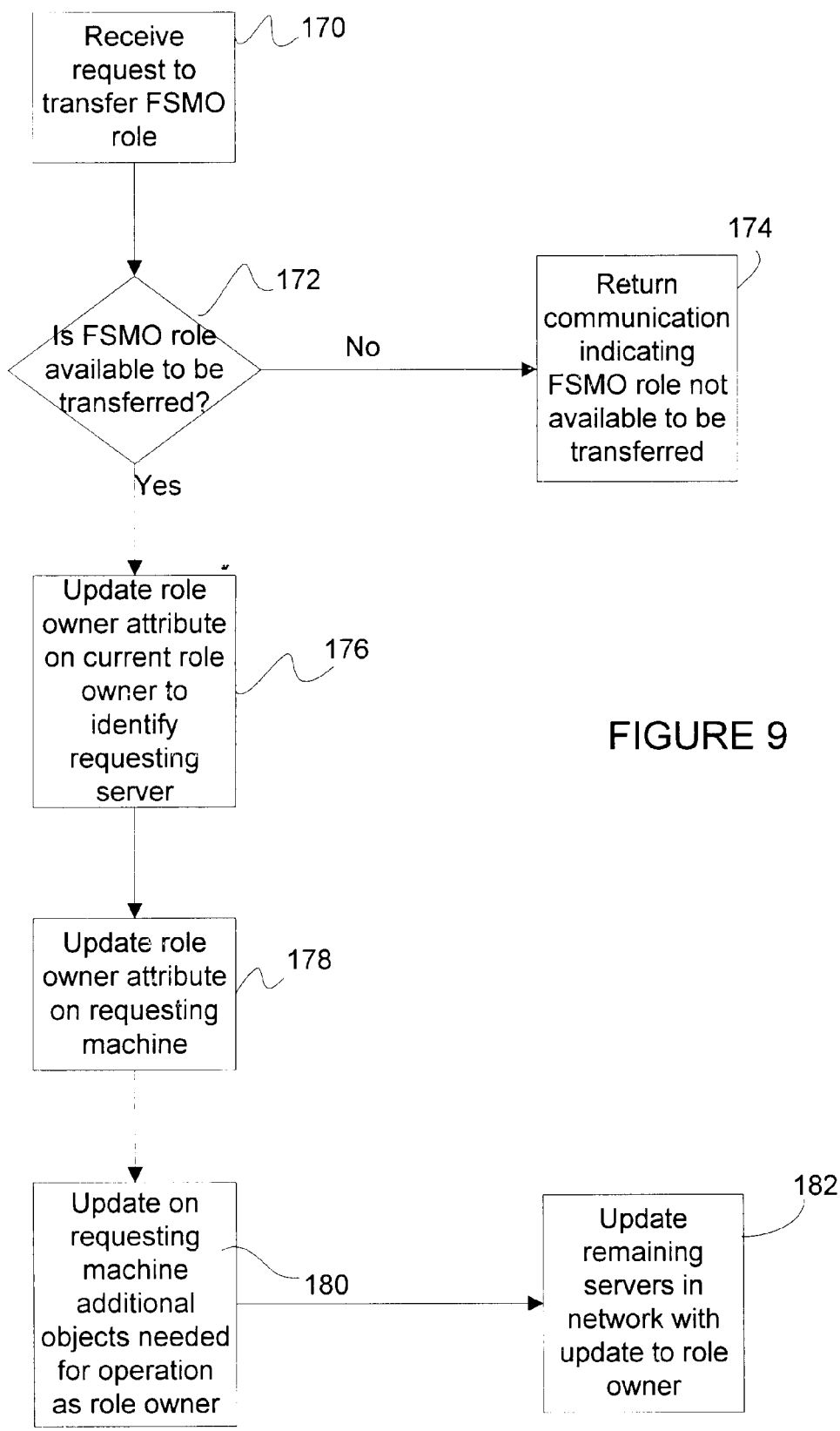
FIG. 9 is a flow diagram of a process in accordance with the present invention of floating a RID Master role from one machine to another.

FIG. 9 provides a flow diagram of the steps involved in floating RID Master role ownership from one domain controller to another domain controller. At step 170, a domain controller, for example domain controller 110c of FIG. 5, requests transfer of RID Master ownership from the current RID Master, domain controller 110a. In the exemplary embodiment, the request is made via the directory service urgent replication functionality as described previously in the exemplary embodiment section.

If, at step 172, RID Master 110a is not available to be transferred, at step 174, a communication to that effect is returned to domain controller 110c. RID Master 110a might not be available for transfer because it is busy performing its duty as RID Master, or domain controller 110a has simply gone off-line. In such situations, transfer of role ownership via normal means is not appropriate. If, however, RID Master 110a is available for transfer, at step 176 the FSMO_Role_Owner attribute on the RID_Master object which identifies the current RID Master and which in the exemplary embodiment is stored in the directory services database, is updated in local copy 112a of the directory service to identify domain controller 110c as the RID Master.

At step 178, the FSMO_Role_Owner attribute on the RID_Master object in local copy 112c of the directory services database located on domain controller 110c is updated to identify domain controller 110c as the new RID Master. At step 180, the RID_Available_Pool attribute defining the most current list of unallocated RIDs, is replicated from local copy 112a of the directory service located on domain controller 110a to local copy 112c of the directory service located on domain controller 110c. In an exemplary embodiment, steps 178 and 180 are performed in the same transaction.

At step 182, the remaining servers in the network are updated via scheduled replication with the RID Master change by updating the RID_Master objects in local copies 112b and 112d of the directory service with the new FSMO_Role_Owner value.

There are situations where transfer of the RID Master role is not appropriate and instead role seizure is necessary. For example, if the current RID Master has crashed, it may be necessary for continued system operation to promote another domain controller in the network to RID Master.

Figure 10:
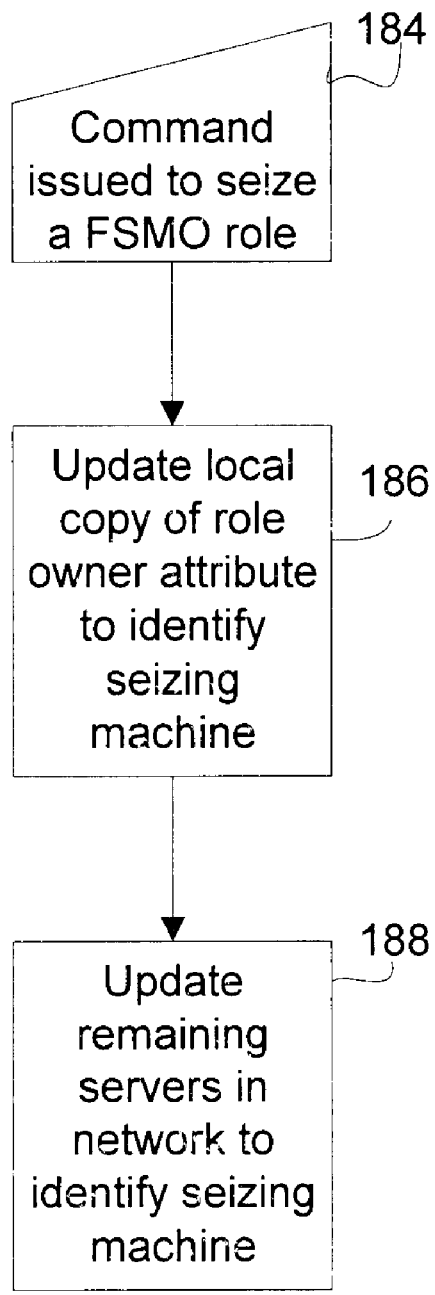
FIG. 10 is a flow diagram of a process in accordance with the present invention of seizing the RID Master role.

FIG. 10 provides a diagram of the role seizure process. As shown, at step 184, a command to seize the RID Master role is issued by a system administrator or other similarly qualified person to a particular domain controller, for example domain controller 110c. In response to the command, at step 186, the FSMO_Role_Owner attribute on the RID_Master object in local copy 112c of the directory service located on domain controller 110c is updated to identify the domain controller 110c as the RID Master role owner. At step 188, the local copies 112b and 112d of the directory service located on domain controllers 110b and 110d are updated to identify domain controller 110c as the new RID Master. In the exemplary embodiment, these updates are made using replication.

A complication associated with role seizure is minimizing the possibility that the RID_Available_Pool attribute from which the newly promoted RID Master allocates pools of RIDs, is out-of-date. Unlike the RID Master floating operation described in relation with FIG. 9 which includes the step of updating the newly promoted RID Master with the latest version of the RID_Available_Pool attribute, in the case of role seizure, the previous RID Master which alone may have the most up-to-date RID_Available_Pool attribute, may not be available. Thus, there is no certainty that the domain controller which is promoted through seizure has an up-to-date RID list. Several precautionary steps may be instituted to minimize this risk. For example, a domain controller that is seizing the RID Master role may be programmed to synchronize its local copy of the master RID pool with the other domain controllers at the time of promotion. Also, the RID free list might be replicated using the urgent replication features of the directory service. Additionally, each domain controller can be programmed to monitor the free RID list. If a change to the free RID list replicates such that the RID pool owned by a domain controller is in the free list, then that domain controller proceeds to invalidate the RID pool and requests a fresh one. According to another measure, the directory service monitors the system for duplicate RIDs. In the exemplary embodiment, all of these precautionary steps are instituted.

Figure 11:
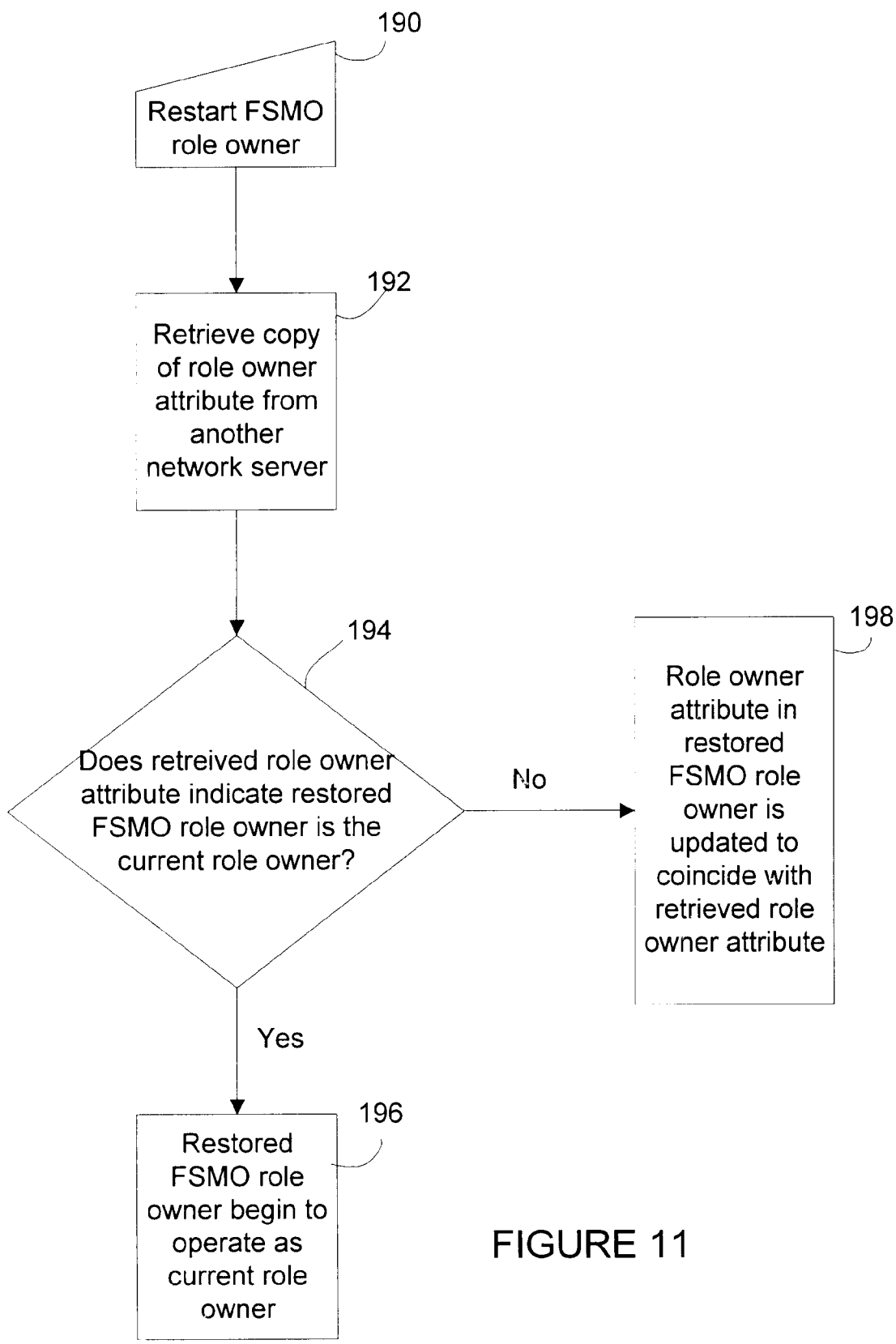
FIG. 11 is a flow diagram of a process in accordance with the present invention of restoring a RID Master.

A RID Master that has gone off-line either as a result of scheduled maintenance or for an unplanned reason may be returned to the network. In these situations it is necessary to account for any changes in RID Master role ownership that may have been instituted while the former RID Master was off-line. For instance, another server may have been promoted to RID Master role owner while the original master role owner was off-line. FIG. 11 provides a flow diagram for restoring a RID Master role owner. At step 190, the former RID Master role owner, for example domain controller 110a of FIG. 5 is restarted. When domain controller 110a is started, it recognizes that local copy 112a of the directory service indicates that domain controller 110a is the owner of the RID Master role. Before beginning to operate as the RID Master in the network, however, domain controller 110a verifies with other domain controllers in the network that it is the RID Master. Therefore, once domain controller 110a is communicating on the network, at step 192, the FSMO_Role_Owner attribute on the RID_Master object is replicated in from another server, for example domain controller 110d. If at step 194, it is determined that the replicated FSMO_Role_Owner attribute identifies domain controller 110a as the role owner, at step 196 domain controller 110a begins to operate as the role owner. If, however, at step 194 the replicated FSMO_Role_Owner attribute identifies another machine in the network as the role owner, at step 198 the FSMO_Role_Owner attribute on domain controller 110a is updated to coincide with the replicated information.

Those skilled in the art understand that computer readable instructions for performing the above described processes can be generated and stored on a computer readable medium. Also, a computer such as that described with reference to FIG. 1 may be arranged with other similarly equipped computers in a network, and each computer may be loaded with computer readable instructions for performing the above described processes. Specifically, referring to FIG. 1, microprocessor 21 may be programmed to operate in accordance with the above described processes.

While the invention has been described and illustrated with reference to specific embodiments, those skilled in the art will recognize that modification and variations may be made without departing from the principles of the invention as described above and set forth in the following claims. In particular, the present invention may be employed to allocate any type of unique identifiers, including relative identifiers. Also, the FSMO_Role_Owner attribute may be stored in any means across domain controllers. Preferably, however, it is stored in a directory service. Further, updates of the FSMO_Role_Owner attribute may be made by any means, but preferably the updates are made using the replication features of a directory service. Accordingly, reference should be made to the appended claims as indicating the scope of the invention.

What is claimed is:

1. In a network comprising a plurality of servers, a system for allocating unique identifiers, comprising:
    a first server operating in a role of a pool server with exclusive authority for allocating pools of unique identifiers to other servers in the network, said first server having stored thereon a first data object identifying said first server as operating in the role of a pool server and a second data object identifying a list of unallocated unique identifiers;
    a second server in communication with the first server, the second server requesting a pool of unique identifiers from the first server and allocating unique identifiers out of the pool; and
    at least a third server operable to request transfer of the role of pool server from the first server to the third server,
        wherein in response to the request from said third server, said first server updates said first data object on said first server to identify said third server as performing the role of a pool server, and said third server stores on said third server a value for said first data object identifying said third server as performing the role of a pool server, and said third server stores on said third server a value for said second data object equivalent to the value of said second data object on said first server when said first server updated said first object to identify said third server as performing the role of a pool server.

2. The system of claim 1 wherein the unique identifiers are relative identifiers (RIDs).

3. The system of claim 2 wherein the RIDs are used to form security identifiers (SIDs).

4. The system of claim 3 wherein the SIDs are assigned to security principals.

5. The system of claim 1, wherein said role of a pool server with exclusive authority for allocating pools of unique identifiers may be transferred from said first server to another server.

6. The system of claim 1, wherein said role of a pool server with exclusive authority for allocating pools of unique identifiers may be seized from said first server by another server.

7. In a network comprising a plurality of servers, wherein each of the servers is capable of allocating pools of unique identifiers, a system for allocating unique identifiers, comprising:
    a first data object identifying a master server to exclusively allocate pools of unique identifiers, wherein the first data object is replicated in each of the plurality of servers, and wherein the first data object is changeable so as to change the identity of the master server to another one of the plurality of servers;
    a second data object identifying a list of unallocated unique identifiers, wherein the second data object is replicated in each of the plurality of servers, and wherein the value of the second data object when the first data object is changed to identify a new master server is transmitted to the new master server; and
    at least one second server in the plurality of servers for requesting a pool of unique identifiers from the master server and allocating individual unique identifiers from the pool of unique identifiers.

8. In a network, a method of allocating unique identifiers comprising the following steps:
    requesting a pool of unique identifiers from a first server having exclusive authority in the network for allocating a pool of unique identifiers, said first server having stored thereon a first data object identifying a server with exclusive authority for allocating a pool of unique identifiers, and a second data object for storing an identification of unallocated identifiers;
    allocating, from the first server, a pool of unique identifiers in response to the request from the second server;
    allocating, from the second server, unique identifiers from the pool of identifiers allocated from the first server;
    updating said first data object on said first server to identify a third server as having exclusive authority for allocating pools of unique identifiers;
    storing on said third server a value for a first data object identifying said third server as having exclusive authority for allocating pools of unique identifiers; storing on said third server a value for a second data object equivalent to the value of said second object on said first server when said step of updating said first data object on said first sever was performed.

9. The method of claim 8, wherein the unique identifiers are relative identifiers.

10. A computer-readable medium having computer-executable instructions for performing the steps recited in claim 8.

11. The method of claim 8, wherein the step of allocating from the first server a pool of unique identifiers further comprises the following steps:
    receiving, from the second server at the first server, a request for a pool of unique identifiers;
    determining whether free unique identifiers are available to satisfy the request for a pool of unique identifiers;
    if unique identifiers are not available to satisfy the request, returning an error message to the second server; and
    if unique identifiers are available to satisfy the request, allocating a pool of unique identifiers, and communicating the pool of unique identifiers to the second server.

12. The method of claim 11, wherein the step of communicating the pool of unique identifiers to the second server is accomplished by replication.

13. The method of claim 11, further comprising the following steps:

determining at the first server whether the second server is within a domain for which the first server is authorized to allocate a pool of unique identifiers;

if the second server is not within the domain for which the first server is authorized to allocate a pool of unique identifiers, returning an error message to the second server;

if the second server is within the domain for which the first server is authorized to allocate a pool of unique identifiers, determining if the first server is authorized to allocate a pool of unique identifier;

if the first server is not authorized to allocate unique identifiers, returning an error message to the second server; and if the first server is authorized to allocate RIDs, performing the step of determining whether free unique identifiers are available to satisfy the request for a pool of unique identifiers.

14. The method of claim 8, wherein the step of allocating from the second server unique identifiers from the pool of identifiers further comprises the following steps:

receiving at the second server a request for a new unique identifier;

determining whether a unique identifier exists in the pool of unique identifiers;

if no unique identifiers are available in the pool of unique identifiers, returning an error indicating no unique identifiers are available; and if unique identifiers are available in the pool of unique identifiers, allocating a unique identifier from the pool of unique identifiers, and adjusting the pool of unique identifiers to account for the unique identifier that is being allocated.

15. The method of claim 14, further comprising the following steps:

determining whether a predetermined threshold of remaining available unique identifiers in the pool has been is reached;

if the threshold has not been reached, continuing to receive requests for a new unique identifier;

if the threshold has been reached, determining whether a request for a new pool of unique identifiers is outstanding;

if a request for a new pool of unique identifiers is outstanding, continuing to receive requests for a new unique identifier; and if no request for a new pool of unique identifiers is outstanding, requesting a new pool of unique identifiers from the first server.

16. The method of claim 8, further comprising the step of returning to the network the second server if the second server had previously been taken off-line.

17. The method of claim 16, wherein the step of returning to the network the second server further comprises the following steps:

determining whether the second server has been restored from backup;

if the second server has been restored from backup, invalidating the pool of unique identifiers on the second server, requesting a new pool of unique identifiers from the first server, receiving at the second server a new pool of unique identifiers from the first server, proceeding to process requests for unique identifiers; and if the second server has not been restored from backup, proceeding to process requests for unique identifiers.

18. The method of claim 8, further comprising the step of transferring exclusive authority in the network for allocating a pool of unique identifiers from the first server to a third server.

19. The method of claim 8, further comprising the step of seizing exclusive authority in the network for allocating a pool of unique identifiers from the first server by a third server.

20. In a network comprising a plurality of servers, a method of allocating unique identifiers, comprising:

requesting a pool of unique identifiers from a first server having exclusive authority in the network for allocating a pool of unique identifiers;

allocating, from the first server to a second server, a pool of unique identifiers;

allocating, from the second server, unique identifiers from the pool of identifiers allocated from the first server;

updating a first data object on said first server to identify a third server as having exclusive authority for allocating pools of unique identifiers;

storing on said third server a value for a first data object identifying said third server as having exclusive authority for allocating pools of unique identifiers;

storing on said third server a value for a second data object equivalent to the value of an object on said first server for identifying the unallocated unique identifiers;

restoring the second server to the network if the second server had previously been taken off-line;

if the first server is off-line, seizing the first server; and restoring the first server to the network if the first server had previously been taken off-line.

21. The method of claim 20, wherein the step of seizing the first server further comprises the following steps:

receiving, at a fourth server in the plurality of servers, a request to seize the first server;

updating the owner attribute located on the fourth server to identify the fourth server; and updating the owner attribute on other servers in the plurality of servers to identify the fourth server.

22. The method of claim 20, wherein the step of restoring the first server, comprises the following steps:

retrieving the owner attribute to the first server from another server in the plurality of servers;

if the retrieved owner attribute identifies the first server, initiating allocation of pools of identifiers; and if the retrieved owner attribute identifies a server other than the first server, updating the owner attribute on the first server to identify the other server.

23. A data structure stored on one or more computer-readable media, the data structure comprising:

a first data object for identifying one server in a plurality of servers to exclusively allocate pools of unique identifiers;

a second data object for identifying a list of unallocated unique identifiers, wherein the first data object and said second data object are replicated on each server in the plurality of servers, and wherein transferring authority to exclusively allocate pools of unique identifiers comprises updating the first data object on a first server presently having authority to exclusively allocate pools of unique identifiers to identify a second server as having authority to exclusively allocate pools of unique identifiers, updating the first data object on the second server to identify the second server as having authority to exclusively allocate pools of unique identifiers, and updating the second data object on the second server to the value of said second data object on said first server when said first data object on said first server was updated to identify the second server as having exclusive authority to allocate identifiers.

24. A computer-readable medium having computer-executable instructions for performing steps comprising:

storing in a first data object on a first server in a network a value identifying said first server as having exclusive authority for allocating pools of unique identifiers in the network;

storing in a second data object on the first server a value identifying the unallocated unique identifiers;

allocating, upon request, from the single server to a second server a pool of unique identifiers;

assigning, from the pool of unique identifiers, a unique identifier to an object;

updating the first data object on said first server to identify a third server as having exclusive authority for allocating pools of unique identifiers;

updating a first data object on said third server to identify said third server as having exclusive authority for allocating pools of unique identifiers; and updating a second data object on said third server to the value of said second data object on said first server when the first data object on the first server was updated to identify said third server as having exclusive authority for allocating pools of unique identifiers.

25. The computer-readable medium of claim 24 wherein the unique identifier is a relative identifier.

26. The computer-readable medium of claim 24 wherein the object is a security principal.

* * * * *